US011308388B2

(12) United States Patent
Philippe et al.

(10) Patent No.: US 11,308,388 B2
(45) Date of Patent: Apr. 19, 2022

(54) ELECTRONIC CIRCUIT, PARTICULARLY FOR THE IMPLEMENTATION OF NEURAL NETWORKS WITH MULTIPLE LEVELS OF PRECISION

(71) Applicant: COMMISSARIAT A L'ÉNERGIE ATOMIQUE ET AUX ÉNERGIES ALTERNATIVES, Paris (FR)

(72) Inventors: Jean-Marc Philippe, Gif-sur-Yvette (FR); Alexandre Carbon, Bures sur Yvette (FR); Marc Duranton, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 973 days.

(21) Appl. No.: 15/781,680

(22) PCT Filed: Dec. 7, 2016

(86) PCT No.: PCT/EP2016/079998
§ 371 (c)(1),
(2) Date: Jun. 5, 2018

(87) PCT Pub. No.: WO2017/108398
PCT Pub. Date: Jun. 29, 2017

(65) Prior Publication Data
US 2019/0005378 A1    Jan. 3, 2019

(30) Foreign Application Priority Data
Dec. 21, 2015 (FR) ................................ 1562912

(51) Int. Cl.
*G06N 3/063* (2006.01)
*G06N 3/06* (2006.01)
*G06N 3/08* (2006.01)

(52) U.S. Cl.
CPC ............ *G06N 3/063* (2013.01); *G06N 3/061* (2013.01); *G06N 3/08* (2013.01)

(58) Field of Classification Search
CPC .......... G06N 3/063; G06N 3/061; G06N 3/08; G06F 13/4009; G06F 13/4013; G06F 15/80
See application file for complete search history.

(56) References Cited

U.S. PATENT DOCUMENTS 10,061,537 B2 *  8/2018  Kersh ................... G06F 3/0656
2013/0282945 A1  10/2013  Kelly et al.
2016/0342893 A1 *  11/2016  Ross ...................... G06F 17/153

FOREIGN PATENT DOCUMENTS

WO    2015/049183 A1    4/2015
WO    2015/090885 A1    6/2015

OTHER PUBLICATIONS

Du, Zidong, et al. "ShiDianNao: Shifting vision processing closer to the sensor." Proceedings of the 42nd Annual International Symposium on Computer Architecture. 2015. (Year: 2015).*

(Continued)

*Primary Examiner* — Benjamin P Geib
(74) *Attorney, Agent, or Firm* — BakerHostetler

(57) ABSTRACT

A circuit comprises a series of calculating blocks that can each implement a group of neurons; a transformation block that is linked to the calculating blocks by a communication means and that can be linked at the input of the circuit to an external data bus, the transformation block transforming the format of the input data and transmitting the data to said calculating blocks by means of K independent communication channels, an input data word being cut up into sub-words such that the sub-words are transmitted over multiple successive communication cycles, one sub-word being transmitted per communication cycle over a communication (Continued)

channel dedicated to the word such that the N channels can transmit K words in parallel.

12 Claims, 4 Drawing Sheets

(56) References Cited

OTHER PUBLICATIONS

Farabet, et al., NeuFlow: A runtime reconfigurable dataflow processor for vision, Computer Vision and Pattern Recognition Workshops (CVPRW), 2011 IEEE Computer Society Conference on, IEEE, Jun. 20, 2011 (Jun. 20, 2011), pp. 109-116, XP031926582.

Misra, et al., "Artificial neural networks in hardware: A survey of two decades of progress", Neurocomputing, Elsevier Science Publishers, Amsterdam, NL, vol. 74, No. 1-3, May 5, 2010 (May 5, 2010), pp. 239-255, XP027517200.

Marcelo, et al., "NNGen: a powerful tool for the implementation of Artificial Neural Networks on a chip", SADIO Electronic Journal of Informatics and Operations Research, vol. 6, No. 1, Jan. 1, 2004 (Jan. 1, 2004), pp. 42-52, XP055303177.

* cited by examiner

ELECTRONIC CIRCUIT, PARTICULARLY FOR THE IMPLEMENTATION OF NEURAL NETWORKS WITH MULTIPLE LEVELS OF PRECISION

CROSS-REFERENCE TO RELATED APPLICATIONS

This application is a National Stage of International patent application PCT/EP2016/079998, filed on Dec. 7, 2016, which claims priority to foreign French patent application No. FR 1562912, filed on Dec. 21, 2015, the disclosures of which are incorporated by reference in their entirety.

FIELD OF THE INVENTION

The present invention relates to an electronic circuit, in particular for the implementation of in-silico neural networks for processing a variety of signals, including multi-dimensional signals such as images.

BACKGROUND

Neural networks are used in numerous applications, in particular in devices, systems or processes making use of learning-based approaches or mechanisms to define the function to be performed.

The hardware architectures of neural systems generally include elementary modules that can implement a group of neurons. A neuron of order i in a neural system performs a function of type:

$$R_i = f\left(\sum_j w_{ij} E_j\right) \quad (1)$$

$w_{ij}$ and $E_j$ respectively being the synaptic weights associated with the neuron and its inputs, $f$ being a function referred to as the activation function.

Initially, the integrated circuits related to the implementation of neural networks were mainly ASICs (application-specific integrated circuits). Then FPGA (field-programmable gate array)-based architectures became available. In a first approach, neural architectures can be classed along two axes. The first axis relates to their implementation, which may be digital, analog, or even hybrid. The second axis relates to their degree of specialization with respect to the neural networks that can be implemented, the architectures potentially being specialized for implementing a few types of well-defined neural networks, for example an RBF (radial basis function) network or a Kohonen map, or potentially being programmable so as to implement a greater variety of networks.

The architectures targeted by the present invention are related to digitally implemented circuits, these circuits being generic or specialized.

One technical problem to be solved in particular is that of effectively producing a complete signal processing chain in silico, in the generic sense, using the neural network approach and to do so with multiple levels of precision in the coding of the data handled during the processing operation. This issue can be broken down into several problems.

Signal processing chains of this type generally include more conventional signal processing operations, for example, convolutions on a signal or an image, in pre- or post-processing. These conventional systems use specialized processors to carry out this type of processing in addition to the neural processing architecture per se, resulting in a more complex and bulkier system, which consumes more power.

The type of neural network used is highly dependent on the application, or even on the input data set. As a general rule, the circuits used for implementing neural networks are specialized for a few types of networks. There is therefore a certain advantage in being able to implement various types of network efficiently on one and the same circuit so as to broaden its field of application.

Related to the preceding point, another implementation parameter that can vary is the size of the network, in particular with respect to the numbers of inputs and the numbers of neurons. Certain circuits used for neural processing are not expandable, thus do not allow the implementation of neural networks the size of which exceeds their hardware capacity. The invention combines mechanisms allowing this expandability to be obtained, both by cascading, or expanding unidirectionally, and by broadcasting, or expanding multidirectionally. This expandability is also extended by mechanisms for virtualizing the weight vectors or the coefficients.

Lastly, since the fields of application for neural networks are very varied, the dynamic behavior required for coding the weight vectors and the inputs of a neural network is consequently very variable. Moreover, for one and the same application and one and the same network, the dynamic behavior required for coding the weight vectors can vary with the phase in which it is operating in the case of online learning. In typical cases, 16-bit coding of the weight vectors during the learning phase is necessary, whereas in the processing phase, 8-bit coding may be enough. Conventional architectures are sized for the worst-case scenario, both with regard to the operators and interconnections and also with regard to the memory. To avoid this sizing for the worst-case scenario, it is necessary to be able to operate with flexible dynamic behavior, suited to the operating phase (allowing more or fewer values to be coded according to the required level of precision).

An analysis of the known solutions shows that they do not succeed in addressing the issue raised above, or address it unsatisfactorily. No solution of the prior art overcomes all of the drawbacks described above.

SUMMARY OF THE INVENTION

One aim of the invention is in particular to overcome these drawbacks, more particularly by making efficient use of the silicon area used to produce the calculating units in which the neural networks are embedded, while allowing calculations with multiple levels of precision. To this end, the subject of the invention is an electronic circuit for the implementation of neural networks, said circuit including at least:

a series of calculating blocks that can each implement a group of neurons;

a transformation block that is linked to said calculating blocks by a communication means and that can be linked at the input of said circuit to an external data bus, said transformation block transforming the format of the input data and transmitting said data to all or some of said calculating blocks by means of K independent communication channels, an input data word being cut up into sub-words such that said sub-words are transmitted over multiple successive communication cycles, one sub-word being transmitted per communication cycle over a communication channel dedicated to said word such that said K channels can transmit K words in parallel in multiple communication cycles.

Said communication means is for example capable of routing or of broadcasting the data transmitted via said K channels to one or more of said calculating blocks.

In one possible embodiment, each calculating block includes at least one calculating module incorporating:

elementary processors in parallel that can each implement the operations of a formal neuron;

a memory storing said data to be sent to said elementary processors, organized into columns each having a width of N bits, N being greater than or equal to 1;

a transformation module that can cut up or join together the sub-words transmitted by said transformation block into other sub-words suitable for the width of said columns;

a group of sub-words at the output of said transformation module forming a word, the sub-words of said group being distributed over one or more of said columns according to the coupling mode of said processors to which they are to be sent.

The width of said channels is for example equal to the width of said columns, each channel having a width of N bits.

The granularity of said elementary processors is for example equal to the width of said columns, said granularity being the maximum number of bits in parallel on any one input of said elementary processors.

In a first coupling mode in which a processor is temporally coupled to itself, at least two sub-words which are for example to be sent thereto are stored in one and the same column so as to be routed to said processor over multiple successive communication cycles.

In a second coupling mode in which at least two processors are spatially coupled, the sub-words which are to be sent thereto are for example stored over multiple columns at one and the same address, said sub-words being routed to said processors in one or more successive communication cycles.

The sub-words making up one and the same word are for example stored both over multiple addresses and over multiple columns of said memory.

Said electronic circuit includes for example a routing module connected between said memory and said processors, said routing module having a number of inputs that is at least equal to the number of columns, each input being linked to one column only, said routing module being capable of routing the sub-words to said processors.

Said routing module is for example capable of broadcasting data from one column to multiple processors.

Said electronic circuit includes for example a memory virtualization block linked to the memories of all of the blocks and to an external memory, via a DMA circuit.

The invention also relates to a signal processing system for the implementation of neural networks, in which said system includes a plurality of electronic circuits such as that described above.

BRIEF DESCRIPTION OF THE DRAWINGS

Other features and advantages of the invention will become apparent with the aid of the following description provided with reference to the appended drawings, in which.

DETAILED DESCRIPTION

Figure 1:
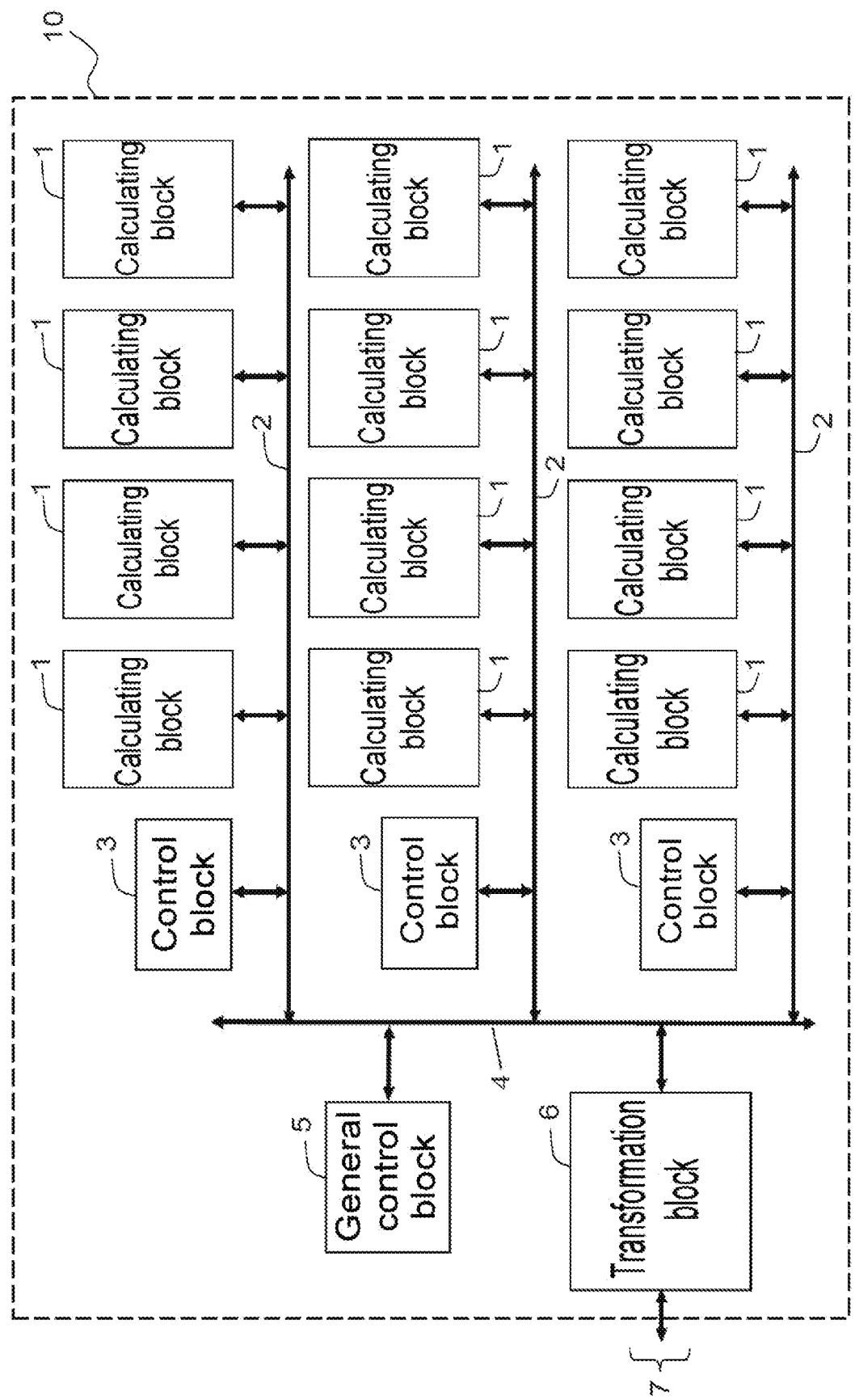
FIG. 1 shows an example of hardware architecture according to the invention.

FIG. 1 presents a hardware architecture according to the invention for the implementation of a neural network, but also for other signal processing applications. The invention will be described hereinafter for a neural network application.

This architecture is therefore described by a circuit 10 for implementing a neural network. This circuit can itself be connected to other identical circuits, by cascading and/or by juxtaposition, to form a complete neural processing chain, including pre- and post-processing operations for images and/or for signals in general. This architecture is composed of one or more data 7 transformation blocks 6 at the input and at the output, of a general control block 5 and of more local control blocks 3 controlling a series of calculating blocks 1 each comprising elementary processors. Each calculating block is capable of implementing a group of neurons. Other types of signal processing can of course be implemented in these blocks.

In the example of FIG. 1, the calculating blocks 1 are distributed in branches. A branch then includes multiple calculating blocks 1, a control block 3 and a communication bus 2 shared by these blocks 1, 3.

The branches, more specifically the communication buses 2, are linked to the general control block 5 and to a transformation block 6 via an interconnection bus 4. Communication between the blocks is controlled by the general control block. This communication takes place asynchronously, for example. The buses 2, 4 can be replaced with any other communication means.

The function of a data transformation block 6 is in particular to cut up an input word 7, arising for example from a memory system, into multiple sub-words having a smaller number of bits, which are transmitted sequentially over the interconnection bus 4. Typically, the input word can be coded on 32 bits and the sub-words can be coded on 8 bits. More generally, consider, by way of example, an input word of $2^P$ bits cut up into $2^Q$ sub-words of $2^P/2^Q$ bits, Q being strictly smaller than P, with a mode of transmission into the circuit 10 such as described below with reference to FIG. 2. It will be seen below that the input words can be coded on a number of bits which is not a power of 2, of the type $2^Q$. An input word can thus be formed of 10 or 12 bits for example. The transformation block includes the resources required to perform the reverse transformation, from the output to the input.

As will be seen below, the transformation block 6 advantageously makes it possible to convert the data at the input of the circuit to the most efficient level of precision inside the architecture in terms of area or power consumed, or even data transfer capacity, with regard to the various interconnection components, in particular the buses 2 and 4. Thus, the aspects related to the conversion of words at input and at output that are associated with internal mechanisms allow the circuit to be optimized during fabrication according to constraints related to the data, to the application or else to the characteristics of the circuit in terms of area and consumption.

Figure 2:
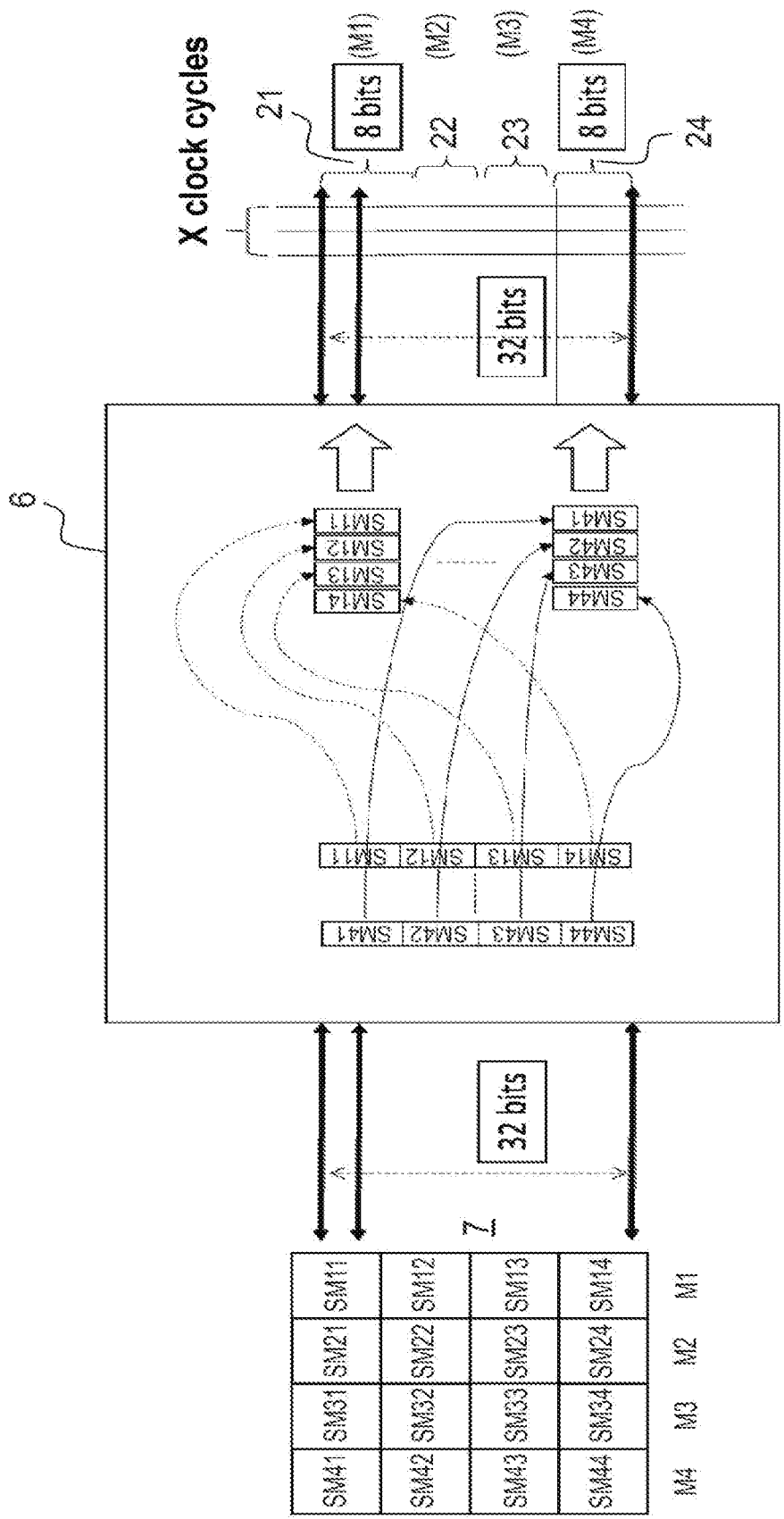
FIG. 2 is a functional diagram of a data transformation block located at the input/output of a circuit according to the invention.

FIG. 2 is an internal functional diagram of the transformation block 6 illustrating the operation of cutting up the input words. The operation is described for input words of 32 bits. In this example, the internal buses of the architecture have a width of 32 bits in total for the data and four independent channels have been chosen. Thus, the granularity of each channel is 8 bits. The sub-words are therefore coded on 8 bits in the transformation block. Partial parallel coding is thus used throughout the internal structure of the circuit, in particular in the various interconnections 2, 4.

In the example of FIG. 2, four independent communication channels 21, 22, 23, 24 are at the output of the transformation block, each channel having a capacity of 8 bits. In this configuration, an input word of 32 bits is transmitted via one of the four channels in four communication cycles (sometimes called transactions).

To illustrate this transformation and transmission operation, consider, by way of example, four successive input words each coded on 32 bits, each word being composed of four sub-words of 8 bits.

By order of arrival, the following words are presented at the input of the transformation block 6:

a first word M1 composed of the sub-words SM11, SM12, SM13 and SM14;

a second word M2 composed of the sub-words SM21, SM22, SM23 and SM24;

a third word M3 composed of the sub-words SM31, SM32, SM33 and SM34;

a fourth word M4 composed of the sub-words SM41, SM42, SM43 and SM44;

In a first communication cycle, the sub-words SM11, SM21, SM31 and SM41 are transmitted over the first channel 21, over the second channel 22, over the third channel 23 and over the fourth channel 24, respectively.

In the second cycle, the sub-words SM12, SM22, SM32 and SM42 are transmitted over the first channel 21, over the second channel 22, over the third channel 23 and over the fourth channel 24, respectively.

In the third cycle, the sub-words SM13, SM23, SM33 and SM43 are transmitted over the first channel 21, over the second channel 22, over the third channel 23 and over the fourth channel 24, respectively.

In the fourth cycle, the sub-words SM14, SM24, SM34 and SM44 are transmitted over the first channel 21, over the second channel 22, over the third channel 23 and over the fourth channel 24, respectively.

Thus, the first word M1 is transmitted over the first channel 21, the second word M2 is transmitted over the second channel 22, the third word M3 is transmitted over the third channel 23 and the fourth word M4 over the fourth channel 24, all in four cycles. To transmit a word of 32 bits, four communication cycles are therefore needed.

In a more general case, with a granularity of $2^Q$ for each channel of the interconnections into the circuit 10, an input word of $2^P$ bits is cut up into $2^P/2^Q$ sub-words of $2^Q$ bits then transmitted in $2^P/2^Q$ cycles through one of the communication channels 21, 22, 23, 24. In the case of there being $2^Q$ channels in parallel, $2^Q$ words can thus be transmitted in parallel in $2^Q$ cycles. In the example of FIG. 2, P is equal to 5 and Q is equal to 2. The description is continued below with this numerical example. It should be noted here that the granularity of the various channels of the interconnections of the circuit also do not have to be a power of 2 (i.e. the sub-words do not have to be coded on $2^Q$ bits).

As mentioned above, the words at the input of the transformation block are not necessarily coded on a number of bits which is a power of 2. In general, an input word is cut up into sub-words such that these sub-words are transmitted in multiple successive communication cycles, one sub-word being transmitted per cycle over a communication channel dedicated to this word. If the block 6 includes K independent communication channels at its output, it can thus transmit K words in parallel over multiple successive communication cycles.

These words M1, M2, M3 and M4 are next transmitted to the calculating blocks 1 for processing them. Transmission takes place by routing if there is a single destination or by broadcasting, possibly partial broadcasting, if all or some of the calculating blocks are to receive these words. Control lines (not shown) complete these channels to control the exchanges. The type of transmission is in particular controlled by the control blocks 3 assigned to the branches in association with the general control block.

Depending on the desired characteristics and the way in which the data to be processed are cut up, the calculating blocks can be configured to couple their operators so as to process the data with a higher level of precision than the basic granularity of their operators. The characteristics mentioned above define a trade-off between speed, low latency and the desired level of precision. Moreover, the coupling possibilities make it possible, on an architecture optimized by virtue of the operation of cutting the words up, to run applications requiring data encoded with different levels of precision than the nominal level of precision of the operators. This feature therefore makes it possible, after fabricating the circuit, to implement applications in various fields. Regarding the trade-offs, for one and the same hardware configuration and data to be processed that are of equal size, low processing latency for each datum, or the possibility to process more data at the same time over a longer time, might be preferred. Similarly, it might be preferred to decrease the level of precision of the processed data so as to process more thereof in parallel, or vice versa. These trade-off choices are specified below.

Figure 3:
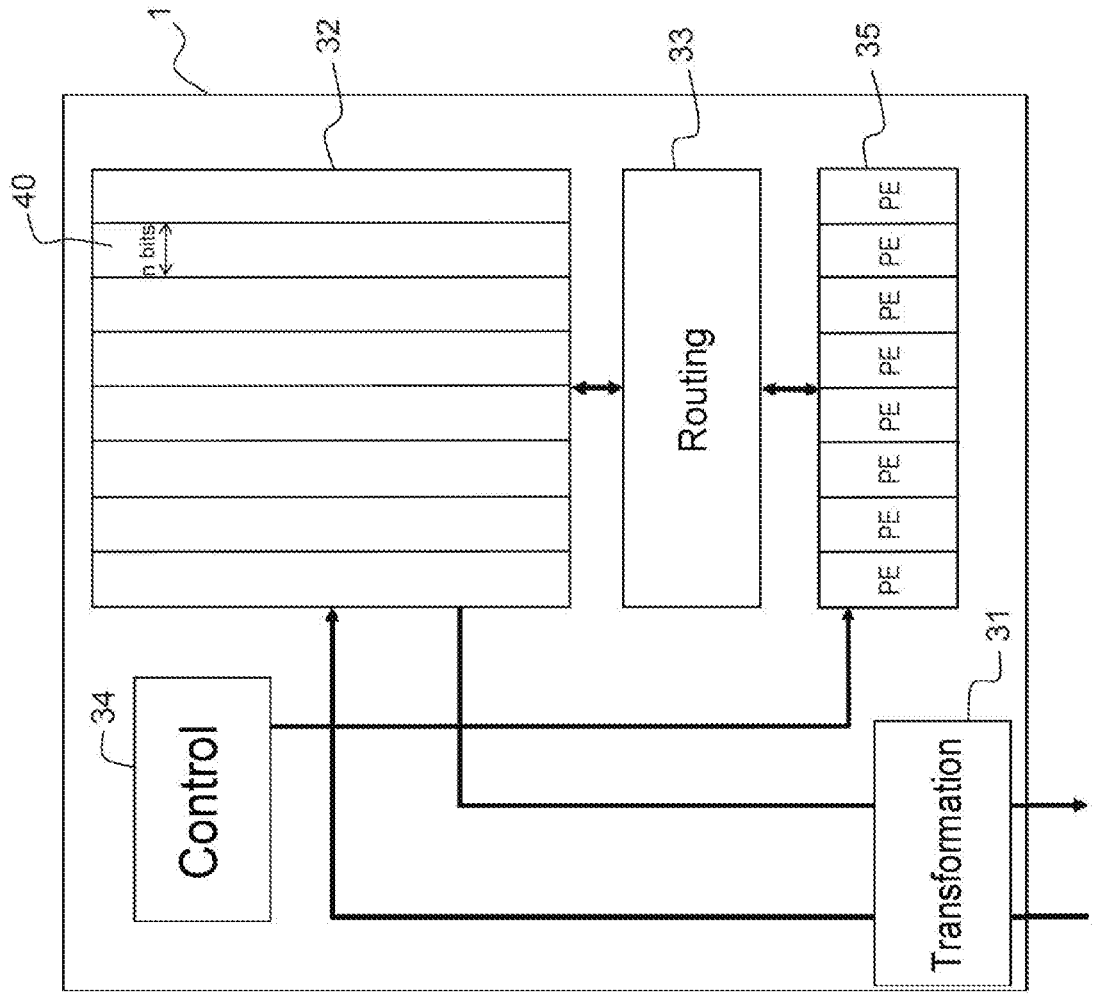
FIG. 3 presents elementary blocks making up a calculating block used in a circuit according to the invention.

FIG. 3 schematically illustrates the modules making up a calculating block 1. Such a block is capable of implementing a group of neurons.

A block 1 includes a local transformation module 31, a memory 32 (for example RAM, for random-access memory), a routing module 33, a control module 34 and a calculating module composed of multiple elementary processors PE. Each elementary processor can perform at least one function of the type of relationship (1):

$$R_i = f\left(\sum_j w_{ij} E_j\right)$$

The memory 32 stores in particular synaptic coefficients and results of intermediate calculations, all of these data being intended for the elementary processors PE. This memory is therefore despecialized.

This memory 32 is organized into columns 40 each having a width of N bits, N being greater than 1. The sub-words making up each stored word are distributed over one or more columns according to the coupling mode of the elementary processors PE. The storage and the coupling modes will be described in greater detail with reference to FIG. 4.

The data processed by the block 1 are the sub-words retrieved over the communication bus 2 by the local transformation module 31, these sub-words arising from the transformation block 6. The function of this transformation module is in particular to transform the data suitable for the communication bus 2, via the transformation block 6, into data suitable for storage in the memory 32, or suitable for computation by the elementary processors PE. This makes it possible in particular for the data to take up the least space possible in the memory 32, or to be processed directly by the processors PE at the level of granularity best suited to the application in progress. Thus, this transformation block 31 advantageously makes it possible to convert the data at the input of the calculating block 1 to the internal level of precision that is the most efficient in terms of area or power consumed, the memory blocks (or memory cuts) having for example very different characteristics depending on their aspect ratio (width, height) for one and the same total capacity.

The transformation performed by the transformation module consists in cutting up or joining together the sub-words transmitted via the communication bus 2 into other sub-words suitable for the width of the columns of the memory 32. In certain cases, this adjustment is not necessary since the sub-words arising from the transformation block 6 can have the same width as the columns of the memory 32. This is for example the case when each channel 21, 22, 23 and 24 has the same width as the columns, conveying N bits in parallel.

After being adjusted (or otherwise) by the transformation module 31, these data are written into the memory 32. At the moment when the series of operations is executed, the association of the control module 44 with the routing module 33 allows the elementary processors PE to be coupled so as to have them cooperate if needed, either temporally (one module processes one and the same datum in multiple computation cycles), or spatially (multiple modules process one datum in one computation cycle, possibly over multiple clock cycles), or both temporally and spatially. In particular, the control module 44 controls the interconnection of the elementary processors with one another.

Figure 4:
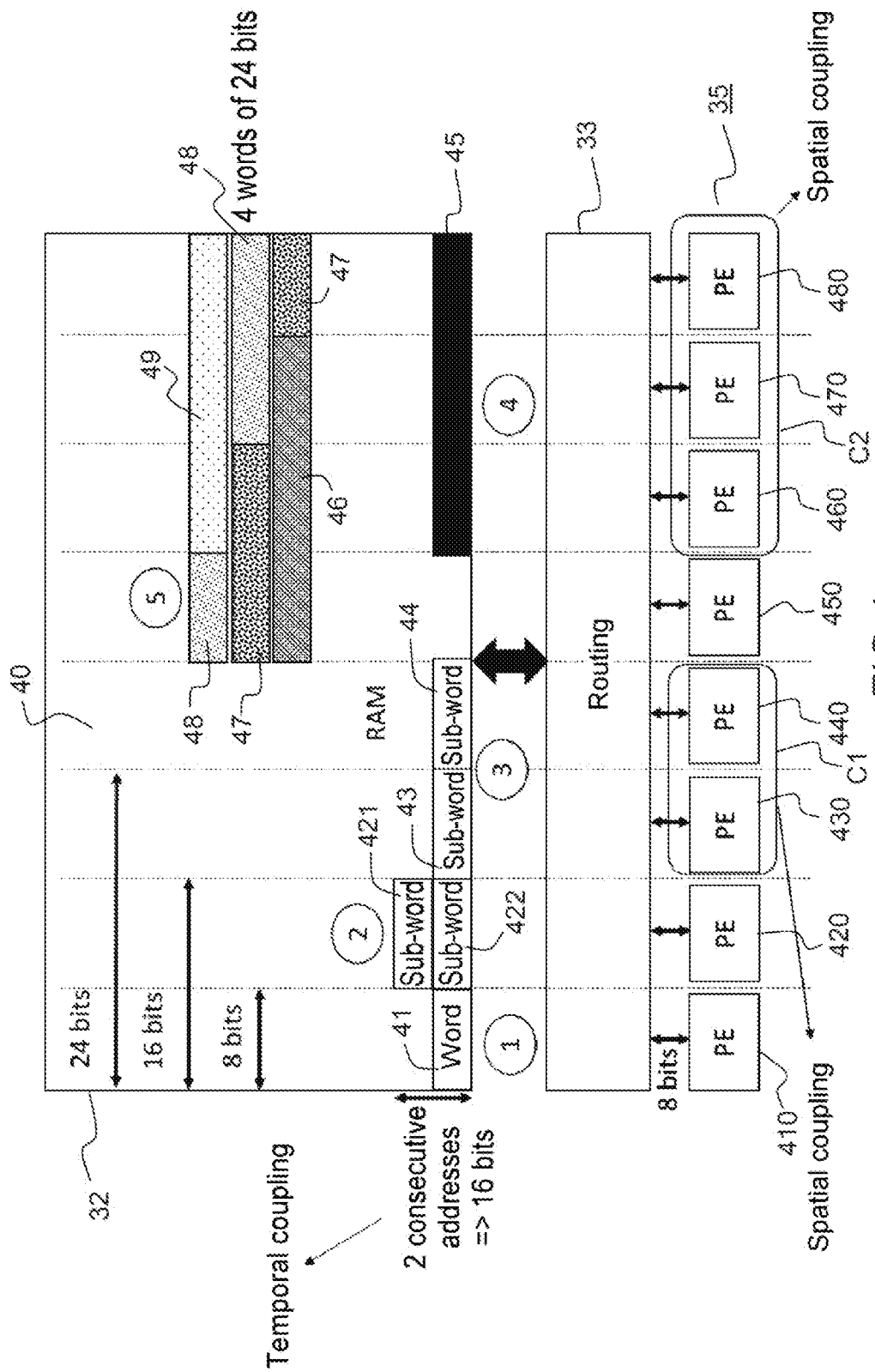
FIG. 4 illustrates the various possible coupling modes between the elementary processors in relation to the organization of storage in the memory, inside a calculating block.

FIG. 4 illustrates these various coupling modes. More particularly, FIG. 4 illustrates the various possible embodiments, by presenting the various storage modes of the words in the memory 32 and the interactions between this memory and the calculating module 35 via the routing module 33.

The basic granularity chosen inside the circuit defines the width of columns 40 inside the memory 32. The basic granularity is in particular the maximum number of bits in parallel at the input of the operators of the elementary processor PE (for example, an 8-bit adder processes input data on 8 bits, etc.). More generally, the granularity is the maximum number of bits in parallel on any input of an elementary processor.

In the example of FIG. 4, the memory includes eight columns of 8 bits, the memory having a width of 64 bits. It would be possible to provide a 32-bit memory composed of four columns, for example, or any other combination. The calculating module 35 includes the same number of elementary processors PE as columns 40 in the memory, the words or sub-words of each column being directed to the processors PE by the routing 33. The routing unit allows any column to be associated with each elementary processor PE, or even allows the datum from a column to be broadcast to all (total broadcast) or some (partial broadcast) of the elementary processors PE. Furthermore, by using this principle, the data from multiple columns can be partially broadcast to various elementary processors PE. The granularity of the processors PE (the number of bits that they process in parallel in a single cycle) is the same as that of the columns 40.

This granularity of the basic operators is chosen when designing the circuit 10 and may be a trade-off between consumption demands, area constraints, running speed requirements and the needs of the application. Consequently, in operation, two internal mechanisms inside a calculating block 1 allow the number of bits of the processed data, and hence the level of precision, to be varied dynamically.

The first mechanism performs temporal coupling on each elementary processor PE. Each of the processors PE of the calculating block is capable of being temporally coupled to itself so as to process data of greater size than its original granularity in multiple cycles. In the example of FIG. 4, this granularity is equal to 8 bits.

In this first mechanism, with a datapath of 8 bits for example, an elementary processor PE could process 16-bit data over two cycles, in particular for an addition. A greater number of cycles would be needed for a multiplication. In this configuration, each processor PE communicates directly with a single column of the memory 32 and does not interact with its neighbours.

Before describing this temporal coupling in FIG. 4, a first embodiment, illustrated in the first column, is described, this corresponding to the simple case in which the size of the data word 41 of the column is perfectly suited to the granularity of the processor 410. Thus, a single memory row and a single memory column are enough to store this word 41.

A second case, illustrated in the second column of the memory, presents an example of temporal coupling. In this case, the storage of a word requires multiple sub-words 421 and 422 on a single column, hence multiple memory addresses. The processor 420 performs the operations in multiple cycles. Data coded on a large number of bits requires a number of cycles that becomes proportionally greater as the level of granularity of the operators chosen during the design phase decreases.

The second mechanism performs spatial coupling between the processors PE. Through this mechanism, the processors can be coupled to one another so as to increase the size of the processed data without increasing the number of cycles required to process them, in particular for addition. For other operations, this does not have to be the case.

This spatial coupling is illustrated in the third and fourth columns of the memory 32. In this example, two elementary processors PE, for example neighboring processors, are coupled so as to process words together that are twice as wide as their granularity. A processed word is then composed of two sub-words 43 and 44 stored at the same memory address, over two columns. Through coupling C1, the two processors 430 and 440 together process 16-bit data. It is of course possible to envisage processing wider words, for example 24- or 32-bit words. In this case, the processed word will be composed of three or four sub-words stored at one and the same memory address.

A fourth case, illustrated in the last three columns, illustrates spatial coupling C2 for processing a 24-bit word 45, stored over these three columns at one and the same address.

A fifth, more complex case, illustrated in the last four columns of the figure, shows that the organization of the memory 32 allows it to be filled optimally. This case combines both mechanisms. In other words, it combines temporal coupling with spatial coupling. More specifically, in this case the special coupling is performed with finer control of the routing module so as to maximize, or to optimize, the use of the memory and of its space. In this case, it is sought, by way of example, to optimize the space for processing four words of 24 bits. In this example, four words 46, 47, 48 and 49 of 24 bits are stored at only three memory addresses, for example three successive addresses. The totality of these words is stored over a width of 32 bits.

To perform the operations, in a first cycle the first word 46 is sent directly to the processors 450, 460 and 470 corresponding to the three columns over which the word 46 is stored, at one and the same memory address. This is done while the sub-word of the second word 47, stored at the same memory address on the last column, is positioned for the second cycle, and stored in a temporary register, for example. In this second cycle, the two other sub-words of the second word 47, stored at the next address, are routed so as to be processed at the same time as the first sub-word, two sub-words of the third word 48 stored at the same address being kept for the third cycle. In this third cycle, the last sub-word of the third word is routed to the processors to be processed at the same time as the two sub-words stored at the preceding address. In the fourth cycle, no memory access occurs, the fourth word 49 being directly available. Thus, with only three memory read operations in this configuration, it has been possible to process four words. This makes it possible both to maximize memory space and to decrease power consumption related to reading the memory 32, which is RAM or SRAM (synchronous random-access memory) for example.

FIG. 4 illustrates another particular advantage of the invention which allows processing with multiple levels of precision, for example processing 16-bit data using 8-bit operators, by temporally expanding the processing operation or by physically coupling the operators by interconnecting two neighbouring operators.

The purpose of the general control block 5 is in particular to configure these temporal or spatial couplings by temporally sending control signals to the various calculating blocks 1 to apply the series of operations required for the processing that is in progress or that will take place, the control signals being transmitted to the internal control units 34.

The above text has described a circuit, in particular for the implementation of a neural network. This circuit can advantageously be used to produce neural networks. On the one hand, the structure of a circuit according to the invention, via its various routing and hierarchical broadcast mechanisms, makes it possible to produce neural networks ranging from those that have relatively few connections to those that are fully connected, while using less silicon. On the other hand, this structure allows expansion via cascading (routing) or by broadcasting between the multiple circuits 10 of the same type, while retaining partially parallel coding, which ensures generality with respect to the dynamic behavior of calculations or, in other words, with respect to suitability for all implementable dynamic behaviors. Interconnection and expandability are facilitated by the asynchronous communication mechanism between the calculating blocks 1.

In one particular embodiment, a smart DMA (direct memory access) mechanism links all of the calculating blocks. It is thus possible to virtualize the data, making it possible to produce neural networks or to perform processing operations on images exceeding the size of the internal memory of the circuit. To this end, the circuit 10 includes a memory virtualization block (not shown) linked to the memories 32 of all of the blocks and to an external memory via a direct memory access (DMA) circuit.

Combining interconnection and virtualization mechanisms additionally allows efficient weight sharing, which is very useful in the implementation of new types of neural networks. Specifically, it is thus possible to increase the total memory available for the architecture, either to store large quantities of data at input in signal processing mode, or to store large quantities of synaptic weights for complex networks in recognition mode.

The invention claimed is:

1. An electronic circuit for the implementation of neural networks, comprising:
   a series of calculating blocks that can each implement a group of neurons; and
   a transformation block that is linked to said calculating blocks by a communication means and that can be linked at the input of said circuit to an external data bus,
   said transformation block transforming the format of the input data and transmitting said data to all or some of said calculating blocks by means of K independent communication channels,
   K input data words being each cut up into sub-words such that said sub-words are transmitted over multiple successive communication cycles,
   one of said sub-words being transmitted per each of said multiple communication cycles over each of said K communication channels, each being dedicated to one of said input data words, such that said K communication channels can transmit said K input data words in parallel in said multiple communication cycles,
   wherein a number of said sub-words, in said respective one input data word, is smaller than a number of bits, in said respective one input data word.

2. The electronic circuit as claimed in claim 1, wherein said communication means is capable of routing or of broadcasting the data transmitted via said K channels to one or more of said calculating blocks.

3. The electronic circuit as claimed in claim 1, wherein each calculating block includes at least one calculating module incorporating:
   elementary processors in parallel that can each implement the operations of a formal neuron;
   a memory storing said data to be sent to said elementary processors, organized into columns each having a width of N bits, N being greater than or equal to 1;
   a transformation module that can cut up or join together the sub-words transmitted by said transformation block into other sub-words suitable for the width of said columns; a group of sub-words at the output of said transformation module forming a word, the sub-words of said group being distributed over one or more of said columns according to the coupling mode of said processors to which they are to be sent.

4. The electronic circuit as claimed in claim 3, wherein the width of said channels is equal to the width of said columns, each channel having a width of N bits.

5. The electronic circuit as claimed in claim 3, wherein, the granularity of said elementary processors is equal to the width of said columns, said granularity being the maximum number of bits in parallel on any one input of said elementary processors.

6. The electronic circuit as claimed in claim 3, wherein, in a first coupling mode, a processor being temporally coupled to itself, at least two sub-words which are to be sent thereto are stored in one and the same column so as to be routed to said processor over multiple successive communication cycles.

7. The electronic circuit as claimed in claim 3, wherein, in a second coupling mode, at least two processors being spatially coupled, the sub-words which are to be sent thereto are stored over multiple columns at one and the same address, said sub-words being routed to said processors in one or more successive communication cycles.

8. The electronic circuit as claimed in claim 5, wherein the sub-words making up one and the same word can be stored both over multiple addresses and over multiple columns of said memory.

9. The electronic circuit as claimed in claim 3, further comprising a routing module connected between said memory and said processors, said routing module having a number of inputs that is at least equal to the number of columns, each input being linked to one column only, said routing module being capable of routing the sub-words to said processors.

10. The electronic circuit as claimed in claim 9, wherein said routing module is capable of broadcasting data from one column to multiple processors.

11. The electronic circuit as claimed in claim 3, further comprising a memory virtualization block linked to the memories of all of the blocks and to an external memory outside said circuit, via a DMA circuit.

12. A signal processing system for the implementation of neural networks, further comprising a plurality of electronic circuits as claimed in claim 1.

\* \* \* \* \*